United States Patent
Luk-Zilberman

(10) Patent No.: US 11,423,660 B2
(45) Date of Patent: Aug. 23, 2022

(54) METHODS AND SYSTEMS FOR DETERMINING EMERGENCY DATA FOR A VEHICLE

(71) Applicant: HERE GLOBAL B.V., Eindhoven (NL)

(72) Inventor: Evgeny Luk-Zilberman, Herzliya (IL)

(73) Assignee: HERE Global B.V., Eindhoven (NL)

( * ) Notice: Subject to any disclaimer, the term of this patent is extended or adjusted under 35 U.S.C. 154(b) by 70 days.

(21) Appl. No.: 16/657,721

(22) Filed: Oct. 18, 2019

(65) Prior Publication Data
US 2021/0117694 A1  Apr. 22, 2021

(51) Int. Cl.
| | | |
|---|---|---|
| G06V 20/00 | (2022.01) | |
| G06V 20/56 | (2022.01) | |
| G06T 7/11 | (2017.01) | |
| G06N 3/04 | (2006.01) | |
| G06V 20/40 | (2022.01) | |

(52) U.S. Cl.
CPC ............ *G06V 20/56* (2022.01); *G06N 3/04* (2013.01); *G06T 7/11* (2017.01); *G06V 20/40* (2022.01); *G06T 2207/20084* (2013.01); *G06T 2207/30252* (2013.01)

(58) Field of Classification Search
CPC .. G06K 9/00791; G06K 9/00711; G06T 7/11; G06T 2207/20084; G06T 2207/30252; G06N 3/04
See application file for complete search history.

(56) References Cited

U.S. PATENT DOCUMENTS

| | | | |
|---|---|---|---|
| 2017/0083792 A1* | 3/2017 | Rodriguez-Serrano | G06T 7/10 |
| 2018/0124331 A1* | 5/2018 | Min | G06K 9/00771 |
| 2019/0057509 A1 | 2/2019 | Lv et al. | |
| 2019/0147245 A1 | 5/2019 | Qi et al. | |
| 2020/0160070 A1* | 5/2020 | Sholingar | G06N 3/084 |

OTHER PUBLICATIONS

Zhang et al, Polarimetric SAR Terrain Classification Using 3D Convolutional Neural Network, IGARSS 2018-2018 IEEE International Geoscience and Remote Sensing Symposium, Jul. 22-27, 2018, pp. 4551-4554 (Year: 2018).*

(Continued)

*Primary Examiner* — Nancy Bitar
*Assistant Examiner* — Xiao Liu
(74) *Attorney, Agent, or Firm* — Ditthavong, Steiner & Mlotkowski

(57) ABSTRACT

A system, a method, and a computer program product are provided for determining emergency data in a region. The system may include a processor configured to execute computer program code instructions stored in a memory to obtain live video data associated with the vehicle in the region and determine the emergency data of the vehicle from the live video data using a three-dimensional convolution neural network (3D-CNN) model. The live video data may include one or more video clips. The 3D-CNN model may include a plurality of convolution layers, a plurality of pooling layers, and a plurality of fully connected layers. The processor is further configured to generate an emergency notification based on the emergency data and providing the emergency notification to one or more subjects.

20 Claims, 6 Drawing Sheets

(56) References Cited

OTHER PUBLICATIONS

O'Shea et al An introduction to convolutional neural networks, arXiv:1511.08458v2 Dec. 2 (Year: 2015).*
Convolutional neural network—Wikipedia (Year: 2022).*
Gary et al., "Traffic Risk Assessment: a Two-stream Approach Using Dynamic-attention", retrieved on Oct. 18, 2019 from http://www.cim.mcgill.ca/~clark/vmrl/web-content/papers/jjclark_crv_2019a.pdf, 10 pages.
Tran et al., "Learning Spatiotemporal Features with 3D Convolutional Networks", 2014, retrieved on Oct. 18, 2019 from https://www.cv-foundation.org/openaccess/content_iccv_2015/papers/Tran_Learning_Spatiotemporal_Features_ICCV_2015_paper.pdf, pp. 4489-4497.
Gao et al., "Predicting Hazardous Driving Events Using Multi-Modal Deep Learning Based on Video Motion Profile and Kinematics Data", Nov. 2018, 6 pages.
Ji et al., "3D Convolutional Neural Networks for Human Action Recognition", retrieved on Oct. 18, 2019 from http://users.eecs.northwestern.edu/~mya671/mypapers/ICML10_Ji_Xu_Yang_Yu.pdf, 8 pages.
Mobileye, "Our Technology" retrieved on Oct. 18, 2019 from https://www.mobileye.com/our-technology, 7 pages.

* cited by examiner

METHODS AND SYSTEMS FOR DETERMINING EMERGENCY DATA FOR A VEHICLE

TECHNOLOGICAL FIELD

The present disclosure generally relates to routing and navigation, and more particularly relates to determining, emergency data associated with a vehicle in a region, from live video data using a 3D convolution neural network.

BACKGROUND

Various navigation applications are available to provide navigation assistance, for example directions for driving, walking, or other modes of travel. Web-based and mobile app-based systems offer navigation applications that allow a user to request directions from one point to another. Quite often, a vehicle receiving the navigation assistance may encompass hazardous situations on the route. In order to provide reliable navigation, the vehicle should be accurately notified about the hazards in advance that appear in field of view of the vehicle. Current solutions fail to accurately provide notification of potentially dangerous situations. To this end, the map data utilized for providing the navigation assistance should provide accurate notification of such potential hazardous situations. Especially, in the context of navigation assistance for autonomous vehicles, it is important that the assistance provided is real-time and accurate.

BRIEF SUMMARY

Accordingly, there is a need for providing reliable, accurate, and near real time indication of emergency or hazardous situation present in a vicinity of the vehicle. Example embodiments of the present disclosure provide a system, a method, and a computer program product for determining emergency data associated with the vehicle in the region.

Some example embodiments disclosed herein provide a system for determining emergency data associated with the vehicle in a region. The system may include at least one memory configured to store computer program code instructions, and at least one processor configured to execute the computer program code instructions to obtain live video data associated with the vehicle. The live video data comprises one or more video clips, each video clip having equal frame count with the vehicle. The at least one processor is further configured to determine emergency data associated with the vehicle in the region, based on the live video data of the vehicle using a three dimensional (3D) convolution neural network (CNN) model. The 3D-CNN model comprises a plurality of convolution layers, a plurality of pooling layers, and a plurality of fully connected layers.

According to some example embodiments, the at least one processor is further configured to generate an emergency notification based on the emergency data and provide the emergency notification to one or more subjects associated with the vehicle.

According to some example embodiments, the at least one processor is further configured to control an output interface of one or more user devices associated with the vehicle to render the emergency data on at least one of a map or map instructions provided to the one or more subjects via one or more user interfaces.

According to some example embodiments, the at least one processor is further configured to process the live video data associated with the vehicle based on dividing the live video data into the one or more video clips comprising a plurality of image frames and processing the one or more video clips using the 3D-CNN model.

According to some example embodiments, the 3D-CNN model comprises a first set of layers including two convolution layers of the plurality of convolution layers and two pooling layers of the plurality of pooling layers stacked in an alternating sequence.

According to some example embodiments, the 3D-CNN model further comprises a second set of layers connected to the first set of layers. The second set of layers include a third convolution layer and a fourth convolution layer of the plurality of convolution layers connected to the first set of layers in succession, a third pooling layer connected to the fourth convolution layer, a fifth convolution layer connected to the third pooling layer, and a fourth pooling layer connected to the fifth convolution layer in a sequence.

According to some example embodiments, the 3D-CNN model further comprises a fully connected layer connected to the second set of layers and a softmax layer connected to the fully connected layer.

According to some example embodiments, to determine emergency data the at least one processor is further configured to extract spatial features of the live-video data using the plurality of convolution layers and the plurality of pooling layers of the 3D-CNN model.

In some example embodiments, a method may be provided for determining emergency data associated with the vehicle in the region. The method comprises obtaining live video data associated with a vehicle. The live video data comprises one or more video clips, each video clip having equal frame count. The method further comprises determining the emergency data associated with the vehicle in the region, based on the live video data of the vehicle using a three dimensional (3D) convolution neural network (CNN) model, wherein the 3D-CNN model comprises a plurality of convolution layers, a plurality of pooling layers, and a plurality of fully connected layers.

Some example embodiments disclosed herein may provide a computer programmable product comprising a non-transitory computer readable medium having stored thereon computer executable instruction which when executed by one or more processors, cause the one or more processors to carry out operations for determining emergency data associated with the vehicle in the region. The operations comprising obtaining live video data associated with a vehicle. The live video data comprises one or more video clips, each video clip having equal frame count and determining emergency data associated with the vehicle in the region, based on the live video data of the vehicle using a three dimensional (3D) convolution neural network (CNN) model, wherein the 3D-CNN model comprises a plurality of convolution layers, a plurality of pooling layers, and a plurality of fully connected layers.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
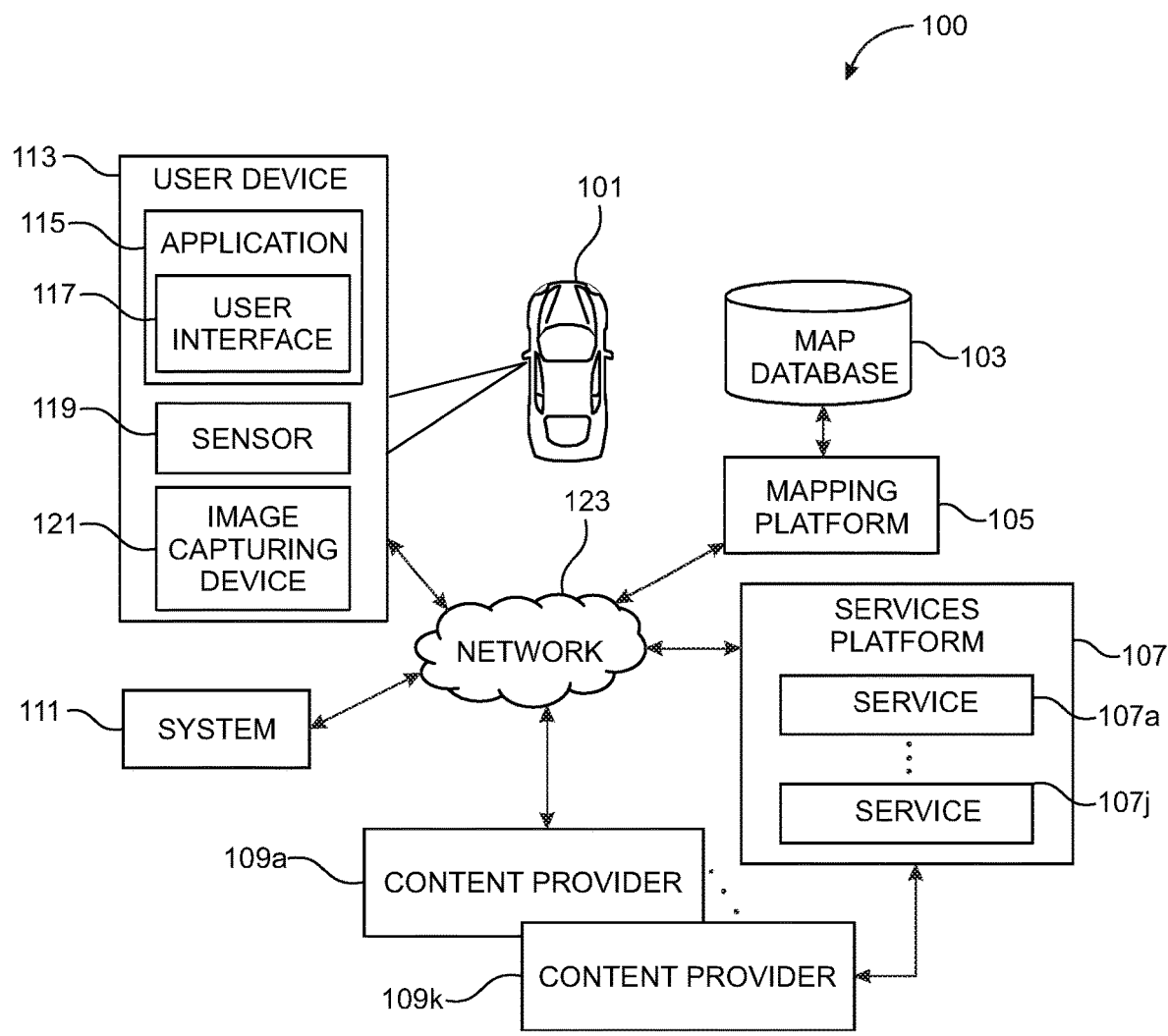
Figure 2:
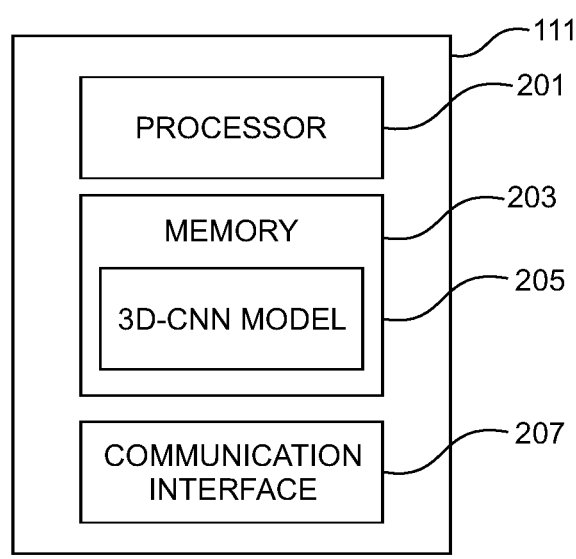
Figure 3:
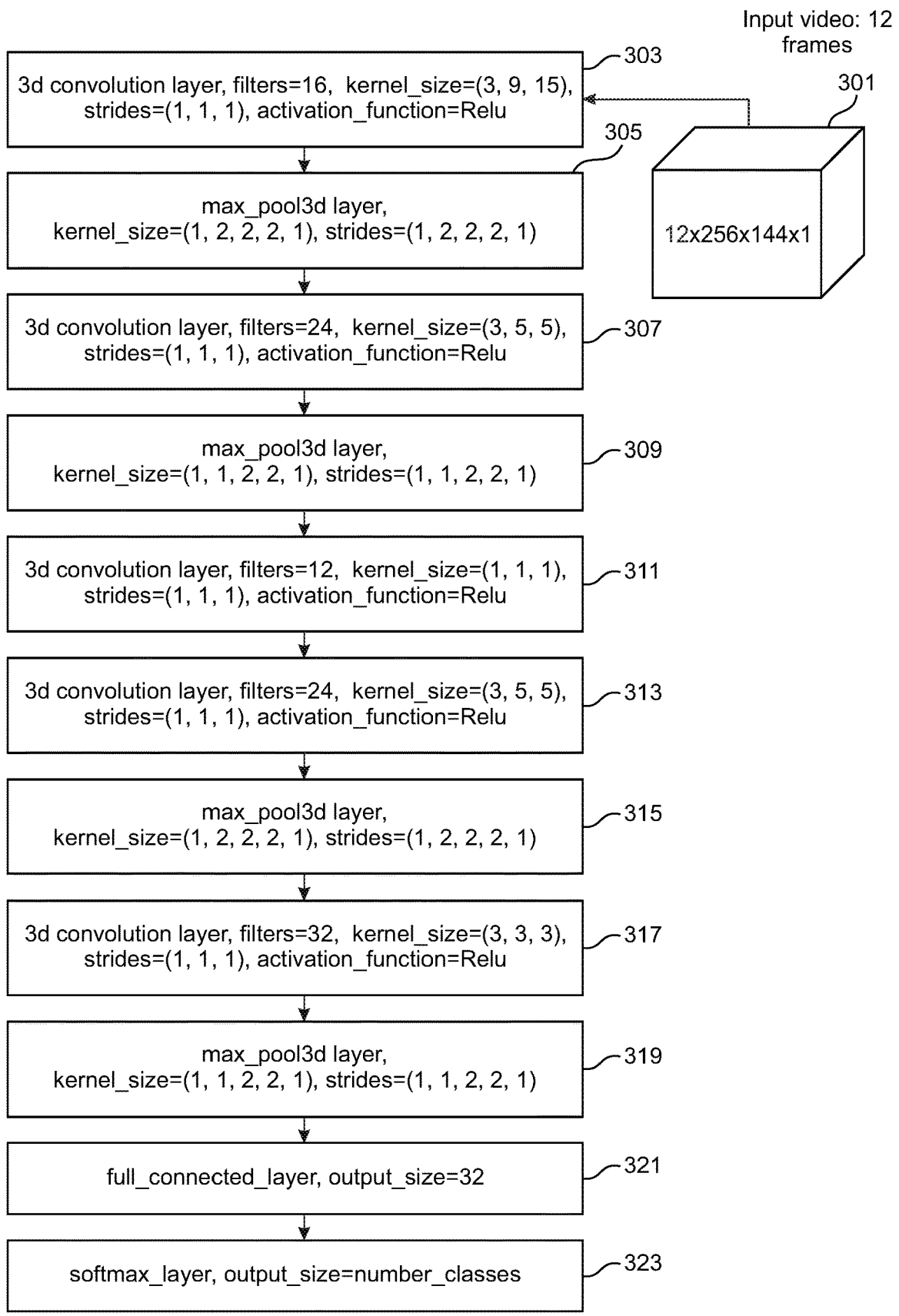
Figure 4:
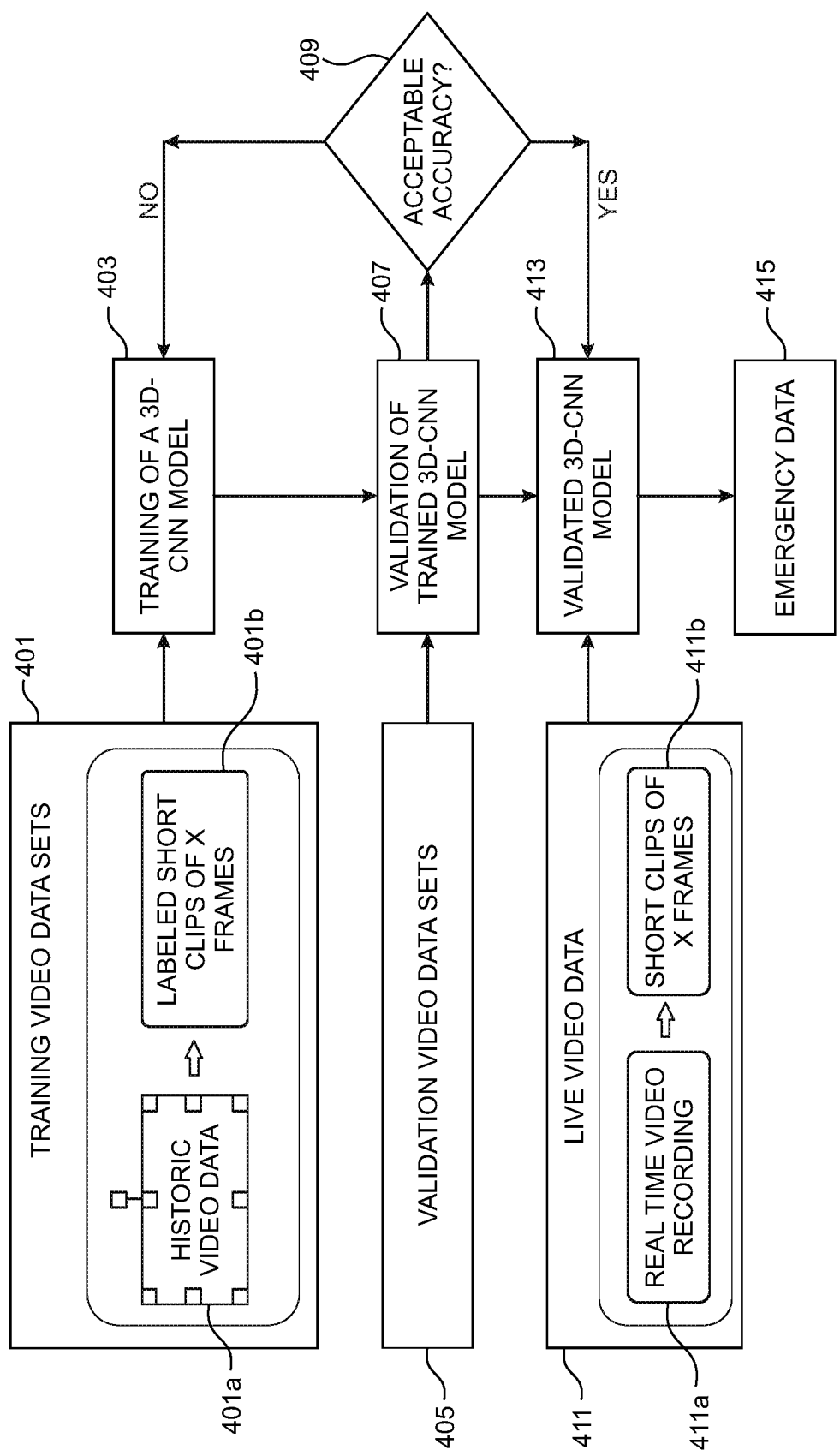
Figure 5:
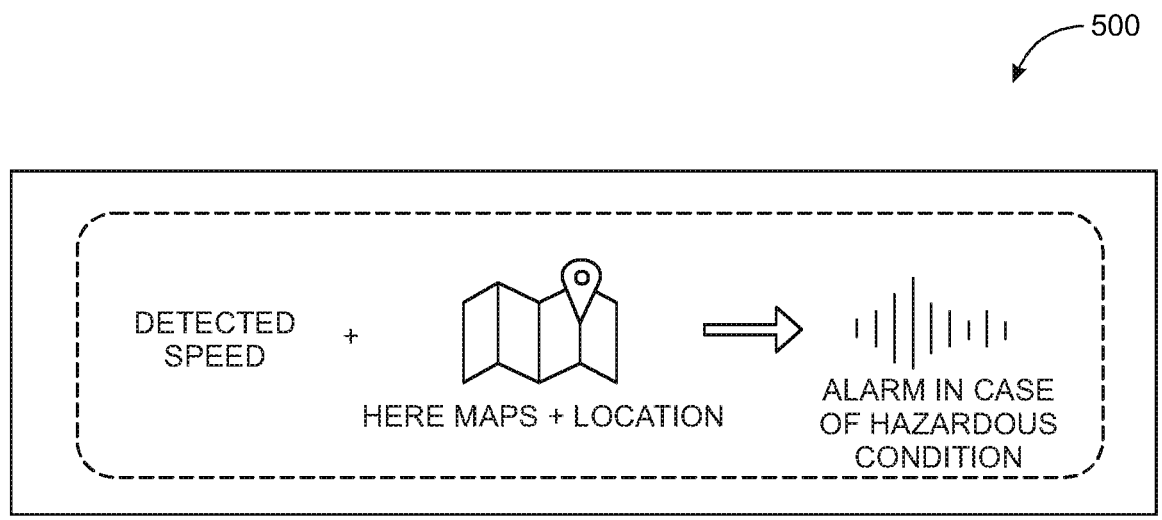
Figure 6:
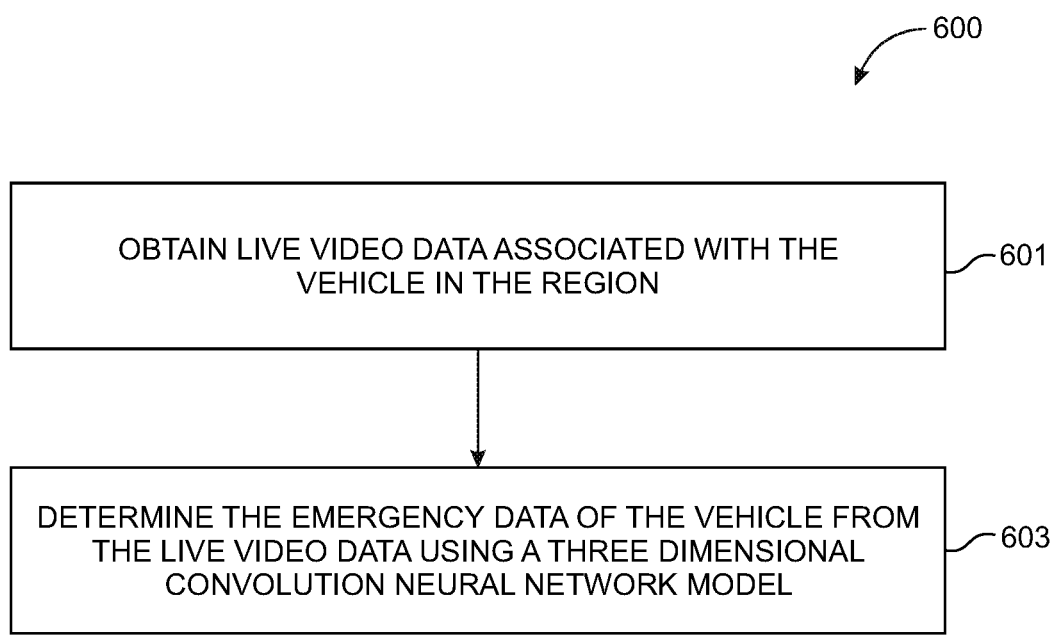

Having thus described example embodiments of the invention in general terms, reference will now be made to the accompanying drawings, which are not necessarily drawn to scale, and wherein:

FIG. 1 illustrates a schematic diagram of an environment of operation of a system for determining emergency data associated with a vehicle in a region from live video data, in accordance with an example embodiment;

FIG. 2 illustrates a block diagram of the system, exemplarily illustrated in FIG. 1, for determining emergency data associated with the vehicle from live video data, in accordance with an example embodiment;

FIG. 3 illustrates a flowchart showing architecture of a validated 3D-CNN model, in accordance with an example embodiment;

FIG. 4 illustrates a flowchart comprising the steps performed by the system for training and validating the 3D-CNN model for indicating emergency data from live video data, in accordance with an example embodiment;

FIG. 5 exemplarily illustrates a schematic diagram representing generation of an emergency notification by the system, in accordance with an embodiment; and FIG. 6 illustrates a method for determining emergency data in a region, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular 12 device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The 3D-CNN (Convolution neural network) may refer to deep learning algorithm which takes an input image as pixel data, assigns importance to various aspects or objects in the input image to extract features of the input image that are important for discrimination and suppresses irrelevant variations, and outputs a correct label for the extracted features.

The term "autonomous vehicle" may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles.

End of Definitions

Embodiments of the present disclosure may provide a system, a method and a computer program product for determining emergency data in a region. In one or more example embodiments, the determined emergency data may be used to generate emergency or hazardous notification. These and other technical improvements of the invention will become evident from the description provided herein.

FIG. 1 illustrates a schematic diagram of an environment 100 of operation of a system 111 for determining emergency data associated with a vehicle 101 in a region based on live video data, in accordance with an example embodiment. The system 111 obtains live video data associated with the region captured from one or more sensors 119, such as, imaging sensors, for example, video cameras, dash board cameras, web cameras, camcorders, etc., associated with the vehicle 101. The vehicle 101 may be an autonomous vehicle. In some example embodiments, the vehicle 101 may be non-autonomous manually driven vehicle. The autonomous vehicle may refer to a vehicle having autonomous driving capabilities at least in some conditions. The autonomous vehicle may have fully autonomous or semi-autonomous driving capabilities at least in some conditions with minimal or no human interference. For example, an autonomous vehicle is a vehicle that drives and/or operates itself without a human operator, but may or may not have one or more passengers. The system 111 may employ a machine learning model as disclosed in the detailed description of FIG. 2 to determine emergency data in the region associated with the vehicle 101 from the live video data of the region.

As exemplarily illustrated, the environment 100 includes a user-equipment (UE) or a user device 113, which may be in communication with the system 111 over a network 123. The network 123 may be wired, wireless, or any combination of wired and wireless communication networks, such as cellular, Wi-Fi, internet, local area networks, or the like. In one embodiment, the network 123 may include one or more networks, such as, a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The user device 113 may be a navigation system, that may be configured to provide route guidance and navigation related functions to the user of the vehicle 101. The user device 113 may be installed in the vehicle 101 or may be in possession of the occupants of the vehicle 101. The user device 113 may also include an image capturing device 121, such as a camera that may function as a dashboard camera or a web based camera. The user device 113 may also include one or more sensors 119 such as an acceleration sensor, a gyroscopic sensor, a LIDAR sensor, a proximity sensor, a motion sensor and the like. The sensors 119 may primarily be used for determining positioning of the vehicle 101 and the sensors 119 may be built-in or embedded into or within interior of the user device 113.

The user device 113 may include a mobile computing device such as a laptop computer, tablet computer, mobile phone, smart phone, navigation unit, personal data assistant, watch, camera, or the like. Additionally or alternatively, the user device 113 may be a fixed computing device, such as a personal computer, computer workstation, kiosk, office terminal computer or system, or the like. The user device 113 may be configured to access a mapping platform 105 through, for example, a user interface 117 of a mapping application 115, such that the user device 113 may provide navigational assistance to the user among other services provided through access to the mapping platform 105. In some embodiments, the user device 113 uses communication signals for position determination. The user device 113 may receive location data from a positioning system, a Global Navigation Satellite System, such as Global Positioning System (GPS), Galileo, GLONASS, BeiDou, etc., cellular tower location methods, access point communication fingerprinting such as Wi-Fi or Bluetooth based radio maps, or the like. The data collected by the sensors 119 may be used to gather information related to an environment of the vehicle 101. Vehicle data also referred to herein as "probe data", may be collected by any device capable of determining the necessary information, and providing the necessary information to a remote entity. The user device 113 is one example of a device that can function as a probe to collect probe data of a vehicle 101.

More specifically, probe data collected by the user device 113 may be representative of the location of a vehicle 101 at a respective point in time and may be collected while the vehicle 101 is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GNSS coordinates, proximity readings associated with a radio frequency identification (RFID) tag, or the like), rate of travel (e.g. speed), direction of travel (e.g. heading, cardinal direction, or the like), device identifier (e.g. vehicle identifier, user identifier, or the like), a time stamp associated with the data collection, or the like. The user device 113 may be any device capable of collecting the aforementioned probe data.

As exemplarily illustrated, the mapping platform 105 may communicate with a map database 103, which may include node data, road segment data or link data, point of interest (POI) data, posted signs related data or the like. The map database 103 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, for example, cars, trucks, buses, motorcycles, and/or other entities. Optionally, the map database 103 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 103 can include data about the POIs and their respective locations in the POI records. The map database 103 may additionally include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 103 can include event data (e.g., traffic incidents, construction activities, scheduled events, unscheduled events, etc.) associated with the POI data records or other records of the map database 103 associated with the mapping platform 105.

A content provider such as a map developer may maintain the mapping platform 105. By way of example, the map developer can collect geographic data to generate and enhance the mapping platform 105. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Crowdsourcing of geographic map data can also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. Also, remote sensing, such as aerial or satellite photography, can be used to generate map geometries directly.

The map database 103 of the mapping platform 105 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as, by the user device 113, for example. The navigation-related functions can correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, off-street parking predictions, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

In some embodiments, the mapping platform 105 may be a master geographic database configured at a server side, but in alternate embodiments, a client side mapping platform 105 may represent a compiled navigation database that may be used in or with end user devices (e.g., user device 113) to provide navigation, speed adjustment and/or map-related functions. For example, the mapping platform 105 may be used with the end user device, that is, the user device 113 to provide the user with navigation features. In such a case, the mapping platform 105 can be downloaded or stored on the user device 113 which can access the mapping platform 105 through a wireless or a wired connection, over the network 123.

In one embodiment, the user device or the user equipment 113 can be an in-vehicle navigation system, such as, an infotainment system, a personal navigation device (PND), a portable navigation device, a cellular telephone, a smart phone, a personal digital assistant (PDA), a watch, a camera, a computer, a workstation, and/or other device that can perform navigation-related functions, such as digital routing and map display. An end user can use the user equipment 113 for navigation and map functions such as guidance and map display, for example, notification on exceeding speed limits on a route, according to some example embodiments. The user device 113 may include an application, for example, a mapping application 115 with a user interface 113 that may enable the user to access the system 111 and the mapping platform 105 for availing the functions, such as, determining emergency data of the vehicle 101 from the captured live video data.

The environment 100 may further include a services platform 107, which may be used to provide navigation related functions and services 107a-107i to the application 104 running on the user device 113. The services 107a-107i may include such as navigation functions, speed adjustment functions, traffic related updates, weather related updates, warnings and alerts, parking related services, indoor mapping services, and the like. The services 107a-107i may be provided by a plurality of content providers 109a-109k. In some examples, the content providers 109a-109k may access various SDKs from the services platform 107 for implementing one or more services. In an example, the services platform 107 and the mapping platform 105 may be integrated into a single platform to provide a suite of mapping and navigation related applications for OEM devices, such as the user device 113. The user device 113 may be configured to interface with the services platform 107, the content provider's services 109a-109k, and the mapping platform 114 over a network 123. Thus, the mapping platform 105 and the services platform 107 in combination with the system 111 may enable provision of cloud-based services for the user device 113, such as, generating emergency data for the vehicle 101 carrying the user device 113, from live video data.

FIG. 2 exemplarily illustrates a block diagram of the system 111 that may be used to determine emergency data associated with a vehicle from live video data, in accordance with an example embodiment of the present invention. In the embodiments described herein, the system 111 may include a processing means, such as, at least one processor (hereinafter interchangeably used with processor) 201, a storage means, such as, at least one memory (hereinafter interchangeably used with memory) 203, and a communication means, such as, at least one communication interface (hereinafter interchangeably used with communication interface) 207. The processor 201 may retrieve computer program code instructions that may be stored in the memory 203 for execution of the computer program code instructions. The memory 203 may store a three dimensional (3D) convolution neural network (CNN) (3D-CNN) model 205 that is trained and tested to determine hazardous situations on road from live video data. The processor 201 receives an input such as live video data from a user, and renders output, such as the emergency data associated with the vehicle 101 on the road, a notification related to the emergency data, etc., to the user through the communication interface 207.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally or alternatively, the processor 201 may include one or more processors configured in tandem via the bus to enable independent execution of instructions, pipelining and/or multithreading. Additionally or alternatively, the processor 201 may include one or more processors capable of processing large volumes of workloads and operations to provide support for big data analysis. In an example embodiment, the processor 201 may be in communication with the memory 203 via a bus for passing information among components of the system 111.

The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein.

Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201. The environment, such as, 100 may be accessed using the communication interface 207 of the system 111. The communication interface 207 may provide an interface for accessing various features and data stored in the system 111.

The processor 201 of system 111 generates a validated 3D-CNN model 205 and stores in the memory 203. The 3D-CNN model 205 is a variant of a convolutional neural network model. The convolutional neural network model is a type of artificial neural network model used for processing pixel data in an image for image recognition and image processing. The CNN model is based on deep learning algorithm which takes an input image as pixel data, assigns importance to various aspects or objects in the input image to extract features of the input image that are important for discrimination and suppresses irrelevant variations, and outputs a correct label for the extracted features. The 3D-CNN model 205 takes a video as an input, extracts features from a set of images that constitute the video, and outputs a label for the video for which the 3D-CNN model 205 is trained.

The processor 201 trains the 3D-CNN model 205 using a plurality of training video data sets and validates using a plurality of validation video data sets. Based on the accuracy of determining emergency data associated with the vehicle 101 from the validation video data sets, the processor 201 re-trains the 3D-CNN model 205 until a validated 3D-CNN model 205 is generated. To the validated 3D-CNN model 205, the processor 201 inputs live video data to obtain the emergency data associated with the vehicle 101 (shown in FIG. 1) in the region based on the live video data as will be described in the detailed description of FIG. 4. In an example embodiment, the region may comprise an area in proximity of the vehicle 101 for example, but not limited to, a circular area of radius 10 KM with center as a center point of the vehicle 101. The scenes present in the field of views of the respective sensors 119 and within the circular area of radius 10 KM in proximity to the vehicle 101 are captured by the sensors 119 or the image capturing device 121 associated with the user device 113. It shall be noted that the area is not limited to a circular area, it can be of any shape and size such as cuboidal, polygon, hyperbola, or the like.

The 3D-CNN model 205 comprises a plurality of layers for feature extraction and a plurality of layers for classification or labelling. The plurality of layers for feature extraction comprises one or more convolution layers and one or more pooling layers. The plurality of layers for classification is one or more fully connected layers. A convolution layer reduces the pixel data in the images into a form which is easier to process, without losing features that are critical for correct prediction. The convolution layer involves convoluting an input image with a kernel to obtain a feature map of the image. The kernel is a filter that is slid over the image and convoluted with the pixel data at the locations of the kernel to obtain a feature map. The kernel functions as feature detectors of the input image. Different kernels when convoluted with the input image may generate different feature maps. A collection of kernels is a filter.

The input to the 3D-CNN model is a multi-channel image, such as, a 3-channel RGB image. Each channel of the input image is convoluted with a kernel of a certain size. The number of kernels used for convoluting the multi-channel image may depend on the number of channels of the input image.

The different parameters of the filter that govern the size of the feature map are depth of the filter, stride of the kernel, and zero-padding of the kernel. The depth of the filter corresponds to the number of the kernels being used for convoluting the input image. The stride of the kernel refers to the number of steps by which the filter slides over the input image. In an embodiment, the stride of the kernel may be manually configured during the process of training the 3D-CNN model. The zero-padding of the kernel is padding the kernel with zeros to ensure when the input image is convoluted with the kernel, many of the features of the input image are retained till the next stage of convolution. The zero-padding of the kernel allows control of the size of the feature maps.

On convolution of the input image with the kernel, the processor 201 obtains a convoluted image that is a feature map of the image from the 3D-CNN model. The processor 201 uses an activation function, such as, a Relu, tanh, sigmoid, etc. on the feature map to introduce non-linearity. The non-linearity is introduced since in real-world the 3D-CNN model may have to train on non-linearities. The output of a Relu activation function is expressed as Max (0, Input) and the Relu activation function replaces all negative pixel data in the feature map by zero and the processor 201 obtains a rectified feature map as the output of the Relu function.

The processor 201 reduces the dimensionality of the obtained rectified feature map but retains important information of the rectified feature map. The processor 201 reduces the dimensionality of the rectified feature map using spatial pooling, such as, Max, Average, Sum, etc. Predominantly used are the Max pooling and the processor 201 extracts the largest pixel data in a window of the rectified feature map and replaces that window with the extracted largest pixel data to output a max pooled feature map. On doing so, some of the inferior features of the rectified feature map are suppressed by the dominant features of the rectified feature map.

The obtained max pooled feature map is an output of a first convolution layer succeeded by a first pooling layer in the 3D-CNN model. The first pooling layer may be succeeded by one or more convolution layers and one or more pooling layers that are alternately stacked or consecutively stacked. The output of the stacked convolution layers and pooling layers may be feature map of the input image that is equi-variant to scale and translation with reduced feature dimensionality. The processor 201 subjects the output of the rectified feature map of a last pooling layer to a fully connected layer. The fully connected layer is a multilayer perceptron that uses a softmax function in an output layer of the 3D-CNN model. The fully connected layer uses the features in the rectified feature map of a last pooling layer for classifying the input image into various classes. The output of the fully connected layer is arbitrary real-valued scores based on the training video data sets of the 3D-CNN model. The softmax function in the output layer of the 3D-CNN model constitutes a softmax layer of the 3D-CNN model. The softmax layer takes the arbitrary real-valued scores as input and outputs a vector values between 0 and 1 that sum up to 1, such as probabilities.

The processor 201 employs a 3D-CNN model 205 with an architecture similar to as disclosed above to determine a class of the input live video data. That is, the class defines at least one category of different categories of emergencies or hazards present in the vicinity of the vehicle in the region. Based on the class, the processor 201 may determine the category from the live video data. The specific architecture of the 3D-CNN model 205 used for determining the emergency data in the region is disclosed in the detailed description of FIG. 3. For the 3D-CNN model 205 to determine the class indicating the category of emergencies or hazards present in the vicinity of the vehicle, the processor 201 trains and validates the 3D-CNN model 205 as exemplarily illustrated in FIG. 4 on training video data sets and validation video data sets. The different categories of hazards may include, but not limited to, a lane blockage due to accident, fallen trees or electricity polls, a landslide area blockage, a natural disaster, a fire explosion on road, higher water level and the like. The processor 201 may train and validate the 3D-CNN model 205 in substantially real-time to determine the presence of any emergency situation along with the category in which the emergency situation falls. For example, but not limited to, in a water clogging situation on the road on which the vehicle is present, the processor 201 determines that the water level is higher than a threshold water level raising an alarming situation and accordingly send notification to the user regarding the high water level along with necessary details such as the distance between the affected area due to water clogging and the location of the vehicle, a rate of increase in the affected area, and a measure to avoid any harm because of the alarming situation. The emergency data as determined by the processor 201 using the 3D-CNN model comprises information related to the emergency situations, for example, but not limited to, presence of flames in case of fire emergency, abnormal position of a vehicle such as an upside down position of car in case of an accident, a condition of a vehicle such as broken doors, windows or glasses of a vehicle in a road accident situation, another vehicle approaching towards the vehicle 101 at a very high speed in a wrong direction in case of a potential accident situation or the like. Based on the above mentioned different key learnings from multiple images of emergency situations captured by the vehicle at different times and at different locations, the 3D-CNN model gets trained to identify the different emergency situations and categorize them in their respective classes.

The memory 203 may include processing instructions for training of the 3D-CNN model 205 with training video data sets that may be real-time video data or historical video data, from vehicles, such as 101. In an embodiment, the training video data may be divided into two sets, a training video data set for training the 3D-CNN model 205 and a validation video data set for validating the trained 3D-CNN model 205 to determine an accuracy of the trained 3D-CNN model 205. The processor 201 may generate the trained 3D-CNN model 205 that determines emergency or hazard for an input live video data at substantially real-time. In one embodiment, the processor 201 uses a training video data set for training the 3D-CNN model 205 to determine emergency data. For an input in the training video data set, the processor 201 trains the 3D-CNN model 205 to generate a corresponding class indicating emergency data.

The training video data sets comprise a plurality of sets of video data captured by one or more vehicles which includes the emergency and are categorized in their respective class of the emergency. The training video data sets are labelled video data sets on which the processor 201 trains the 3D-CNN model 101. Training video data sets comprise a collection of training video data. The training video data may comprise a video that is divided into a plurality of video clips of 12 image frames and a video clip of 12 image frames is labelled with a class indicating category of the emergency or hazard while capturing the video. In an non-limiting example, the different categories of hazards on the road may comprise a lane blockage due to some reason (such as a road accident, fallen tree, heavy object, construction work, pothole, bad-conditioned road, etc.), a landslide prone area, a natural disaster, a fire explosion, a high water level), or potential accident situation (such as another vehicle approaching towards the vehicle 101 with a very high speed or from a wrong direction. The processor 201 trains the 3D-CNN model 205 with the architecture as in FIG. 3 on about 150000 video clips of 12 image frames each to generate a class of emergency data for each of the video clips.

Prior to training the 3D-CNN model 205, the architecture of the 3D-CNN model 205 is selected as exemplarily illustrated in FIG. 3. The 3D-CNN model 205 may comprise a first convolution layer followed by a first pooling layer, a second convolution layer, a second pooling layer, a third convolution layer, a fourth convolution layer, a third pooling layer, a fifth convolution layer, a fourth pooling layer, a fully connected layer, and a softmax layer. The number of filters and filter sizes may also be predetermined and do not change during the process of training.

For training the 3D-CNN model 205 with the above disclosed architecture using a plurality of training video data sets, the kernels of a filter in the convolution layers may be manually initialized with random values and weights of connections between neurons in the fully connected layer may also be manually initialized, via the user device. For a plurality of video clips of the training video data of 12 image frames, the 3D-CNN model 205 may output classes at the fully connected layer. The softmax layer of the 3D-CNN model 205 may output probability for each class. Since the weights and parameters in the kernels are randomly assigned, the output probabilities associated with the plurality of video clips may also be random. The processor 201 calculates a total error, that is a mean-squared error, at the softmax layer as total error=$\Sigma \frac{1}{2}$ (target probability−output probability)$^2$.

The processor 201 may use backpropagation to calculate gradients of the error with respect to the weights and the parameters and processor 201 may use gradient descent to update the parameters of the kernel and the weights to minimize the total error. The processor 201 may adjust weights and the parameters of the kernel based on their contribution to the total error. With the adjusted weights and parameters of the kernel, the 3D-CNN model 205 may again generate the output probabilities for the plurality of video clips and the output probabilities may be closer to the target probabilities due to the adjusted weights and parameters. Since the output probabilities are closer to the target probabilities, the total error may be reduced and the processor 201 generates a trained 3D-CNN model 205 that determines the emergency from the training video data set.

Post training, in one embodiment, the processor 201 may validate the trained 3D-CNN model 205 by providing a validation data set as an input. The validation data set, for example, may include video data, whose corresponding classes indicating the hazardous category are not fed to the trained 3D-CNN model 205, and then the trained 3D-CNN model 205 may not be able to detect that emergency or hazardous category. The processor 201 may be aware of correct corresponding classes indicating the emergency data for the validation video data and the processor 201 may compare the output of the trained 3D-CNN model 205 to the validation video data set with the correct corresponding classes indicating the emergency data. The processor 201 may evaluate the accuracy of the trained 3D-CNN model 205. In one embodiment, if the accuracy of the trained 3D-CNN model 205 is less than a threshold value, the processor 201 may re-train the trained 3D-CNN model 205 and a validated 3D-CNN model 205 with an improved accuracy is generated.

The processor 201 inputs the live video data captured by the sensors 119 of the user device 201 or the vehicle 101 to the validated 3D-CNN model 205 to determine the emergency data in the region. In an embodiment, the processor 201 may perform preprocessing of the live input video data prior to providing the live video data to the 3D-CNN model 205. As a part of preprocessing of the live input video data, the processor 201 may divide the live input video data into a plurality of video clips, where each video clip comprises an equal number of image frames of reduced resolution. The processor 201 inputs the plurality of video clips with same frame count to the validated 3D-CNN model 205. Based on the weights and the parameters of the kernels that are optimized to values as shown in FIG. 3, the 3D-CNN model 205 outputs a class indicating category of emergency or hazard falling on the route of the vehicle. From the output class, the processor 201 multiplies the class with a factor 5 to obtain the category of emergency or hazard.

The processor 201 may render the determined emergency data on the user interface 117 of the user device 113. The user interface 117 of the user device 113 may in turn be in communication with the system 111 to provide output to the user and, in some embodiments, to receive an indication of a user input, such as, the filter size, number of layers in the 3D-CNN model 205. In some example embodiments, the user interface 117 may communicate with the system 111 and displays input and/or output of the system 111. As such, the user interface 117 may include a display and, in some embodiments, may also include a keyboard, a mouse, a joystick, a touch screen, touch areas, soft keys, one or more microphones, a plurality of speakers, or other input/output mechanisms. In one embodiment, the system 111 may comprise user interface circuitry configured to control at least some functions of one or more user interface elements such as a display and, in some embodiments, a plurality of speakers, a ringer, one or more microphones and/or the like. The processor 201 and/or user interface circuitry comprising the processor 201 may be configured to control one or more functions of one or more user interface elements through computer program instructions (for example, software and/or firmware) stored on a memory 203 accessible to the processor 201.

In an embodiment, the processor 201 may generate an emergency notification based on emergency data as disclosed in the detailed description of FIG. 5. The processor 201 may further render the emergency data on the user interface 117 of the user device 113. In an embodiment the system 111 has ability to predict dangerous situations using the video from the mobile camera and there is no need for designated hardware or additional sensor. The 3D-CNN model 205 may determine the emergency data in substantially real-time and the processor 201 may update the rendered emergency data on the user device 113.

FIG. 3 exemplarily illustrates a flowchart showing the architecture of the validated 3D-CNN model, in accordance with an exemplarily embodiment. As exemplarily illustrated, the validated 3D-CNN model 205 comprises a first convolution layer 303 followed by a first pooling layer 305, a second convolution layer 307, a second pooling layer 309, a third convolution layer 311, a fourth convolution layer 313, a third pooling layer 315, a fifth convolution layer 317, a fourth pooling layer 319, a fully connected layer 321, and a softmax layer 323. The input to the first convolution layer 303 is a video clip 301 of video data of 12 image frames, each image frame of size 256*144*1 pixels. The input video data of size 180*720*3 pixels is fed to the processor 201 and the processor 201 divides the live input video data into a plurality of video clips 301 of 12 image frames, each of the size 256*144*1 pixels. The processor 201 reduces the resolution of the live input video to make computation of the emergency data by the 3D-CNN model 205 faster and simpler without losing the features in the live input video data.

The 12 frames of images are input the first convolution layer 303 of the validated 3D-CNN model 205 whose number of filters are configured to be 16 and kernel size is also preconfigured to be (3,9,15) with strides as (1,1,1) and an activation function as Relu. The output of the first convolution layer 303 is a feature map that is passed to the first pooling layer employing maxpooling. The output of the first pooling layer 305 is a maxpooled feature map that is input to the second convolution layer 307 configured with 24 filter, kernel size (3,5, 5), strides=(1,1,1) and the activation function as Relu as exemplarily illustrated. Similarly, the output of the second convolution layer 307 is input to the second pooling layer 309. The second pooling layer 309 is connected to the third convolution layer 311, the third convolution layer 311 is connected to the fourth convolution layer 313, and the fourth convolution layer 313 is connected to the third pooling layer 315. The output of the third pooling layer 315 is input to the fifth convolution layer 317, the fifth convolution layer 317 is connected to the fourth pooling layer 319 to obtain a maxpooled feature map at the output of the fourth pooling layer 319. The max pooled feature is input to the fully connected layer 321 whose output size is 32. The fully connected layer 321 determines the class indicating the emergency data of the vehicle 101 based on the classes, the validated 3D-CNN model 205 is trained. The number of classes that can be output of the fully connected layer may be 321. The classes output by the fully connected layer 321 are input to the softmax layer 323 that outputs a probability corresponding to the class. Based on the class of the output of the fully connected layer 321, the processor 201 may compute the emergency data by multiplying the class with a factor of 5.

The convolution layers, that is, the first convolution layer 303, the second convolution layer 307, the third convolution layer 311, the fourth convolution layer 313, and the fifth convolution layer 317 extract the spatio-temporal features in the video clip 301 of image frames that change from one image to another image. The processor 201 obtains difference in the 12 frames of the video clip 301 to analyze and determine the emergency data in the vicinity of the vehicle.

A code snippet of the 3D-CNN model 205 executed by the processor 201 of the system 111 is as given below:

```
import tensorflow as tf
import numpy as np
FILTERS_1 = 16
FILTERS_2 = 24
FILTERS_3 = 12
FILTERS_4 = 24
FILTERS_5 = 32
FC_SIZE = 32
DTYPE = tf.float32
def inference(boxes, num_classes):
        layer = tf.layers.conv3d(inputs=boxes, filters=FILTERS_1, kernel_size=(3, 9, 15), strides=(1, 1, 1),
                kernel_initializer=tf.contrib.layers.xavier_initializer(uniform=False, seed=1, dtype=DTYPE),
                activation=tf.nn.relu, padding='same', name='layer_1')
    layer=tf.nn.max_pool3d(layer, ksize=[1, 2, 2, 2, 1], strides=[1, 2, 2 ,2, 1], padding='SAME', name='layer_2')
    # layer.shape: (?,6,72,128,32)
    layer = tf.layers.conv3d(inputs=layer, filters=FILTERS_2, kernel_size=(3, 5, 5), strides=(1, 1, 1),
                kernel_initializer=tf.contrib.layers.xavier_initializer(uniform=False, seed=1, dtype=DTYPE),
                activation=tf.nn.relu, padding='same', name='layer_3')
    layer = tf.nn.max_pool3d(layer, ksize=[1, 1, 2, 2, 1], strides=[1, 1, 2, 2, 1], padding='SAME', name='layer_4')
    # layer.shape: (?,6,36,64,48)
    layer = tf.layers.conv3d(inputs=layer, filters=FILTERS_3, kernel_size=(1, 1, 1), strides=(1, 1, 1),
                kernel_initializer=tf.contrib.layers.xavier_initializer(uniform=False, seed=1, dtype=DTYPE),
                activation=tf.nn.relu, padding='same', name='layer_5')
    layer = tf.layers.conv3d(inputs=layer, filters=FILTERS_4, kernel_size=(3, 5, 5), strides=(1, 1, 1),
                kernel_initializer=tf.contrib.layers.xavier_initializer(uniform=False, seed=1, dtype=DTYPE),
                activation=tf.nn.relu, padding='same', name='layer_6')
    layer = tf.nn.max_pool3d(layer, ksize=[1, 2, 2, 2, 1], strides=[1, 2, 2, 2, 1], padding='SAME', name='layer_7')
    # layer.shape: (?,3,18,32,48)
    layer = tf.layers.conv3d(inputs=layer, filters=FILTERS_5, kernel_size=(3, 3, 3), strides=(1, 1, 1),
                kernel_initializer=tf.contrib.layers.xavier_initializer(uniform=False, seed=1, dtype=DTYPE),
                activation=tf.nn.relu, padding='same', name='layer_8')
    layer = tf.nn.max_pool3d(layer, ksize=[1, 1, 2, 2, 1], strides=[1, 1, 2, 2, 1], padding='SAME', name='layer_9')
    # layer.shape: (?,3,9,16,64)
    layer_flat = tf.contrib.layers.flatten(layer, scope='layer_flat')
    # layer_flat.shape: (?,27648)
    layer = tf.layers.dense(layer_flat, FC_SIZE, name='layer_10')
    layer = tf.layers.dense(layer, num_classes, name='layer_11')
```

| return layer | |

FIG. 4 exemplarily illustrates a flowchart comprising the steps performed by the system 111 for training and validating the 3D-CNN model for determining the emergency data in the region of the vehicle 101 from live video data, in accordance with an embodiment. The system 111 receives training video data and splits the training video data into multiple training video data sets 401. The training video data sets comprise the historic video data 401a with corresponding category of the emergency or hazards from which the historic video data are captured. The system 111 splits the historic video data 401a into short clips of a fixed number of frames (X) 401b with corresponding labelled category of the hazard or emergency. The system 111 also receives validation video data sets 405 from a source database. The system 111 uses the training data sets 401 as input for training 403 the 3D-CNN model 205. On training 403 the 3D-CNN model 205, the system 111 generates the trained 3D-CNN model as disclosed in detailed description of FIG. 2. The system 111 validates 407 the generated trained 3D-CNN model against the validation video data sets 405 using short clips of X frames that are labelled in the validation video data sets 405.

The system 111 determines 409 whether the trained 3D-CNN model has an acceptable accuracy. The accuracy of the trained 3D-CNN model refers to the number of times the trained 3D-CNN model makes a correct prediction of the emergency data labelled in the validation video data sets 405. In an embodiment, a user of the system 111 configures the acceptable accuracy for the trained 3D-CNN model. If the trained 3D-CNN model exhibits the acceptable accuracy against the validation video data sets 405, the system 111 generates a validated 3D CNN model 413 from the trained 3D-CNN model. If the trained 3D-CNN model does not exhibit the acceptable accuracy against the validation video data set 405, the system 111 re-trains 403 the trained 3D-CNN model until the acceptable accuracy 409 is met. That is, the system 111 generates the validated 3D-CNN model 413 when the generated trained 3D-CNN model corresponding to the training video data sets 401 meets a predetermined criterion, that is, the acceptable accuracy, on testing the generated trained 3D-CNN model 403 against the validation video data set 405. The system 111 retrains the generated trained 3D-CNN model 403 on the training video data sets 401 until the generated trained 3D-CNN model 403 meets the predetermined criterion, that is, the acceptable accuracy, for the generation of the validated 3D-CNN model 413. The system 111 inputs the live video data 411, that is, the real time video recording 411a that is converted into short clips of fixed frame 411b count to the validated 3D-CNN model 413. The validated 3D-CNN model 413 outputs the emergency data in the region from the live video data 411.

FIG. 5 exemplarily illustrates a schematic diagram representing generation of an emergency notification by the system 111, in accordance with an embodiment. The system 111 generates and renders the emergency notification on an output interface, that is, the user interface 117 of the user device 113. The system 111 accesses the mapping platform and the map database as disclosed in the detailed description of FIG. 1 through the network 123. The system 111 determines and generates the emergency data notification as a text notification or an audio notification on the user interface 117 of the user device 113.

FIG. 6 exemplarily illustrates a method 600 for determining emergency data in the region, in accordance with an example embodiment. It will be understood that each block of the flow diagram 600 of the method may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 111, employing an embodiment of the present invention and executed by a processor 201 of the system 111. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory 203 that may direct a computer or other programmable apparatus to function in a particular manner, such that the instructions stored in the computer-readable memory 203 produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram 600 support combinations of means for performing the specified functions and combinations of operations for performing the specified functions for performing the specified functions. It will also be understood that one or more blocks of the flow diagram 600, and combinations of blocks in the flow diagram 600, can be implemented by special purpose hardware-based computer systems which perform the specified functions, or combinations of special purpose hardware and computer instructions. A method illustrated by the flow diagram 600 of FIG. 6 for determining emergency data associated with the vehicle 101 includes, at 601, obtaining live video data associated with the vehicle 101 in the region. The live video data comprises one or more video clips, each having equal frame count. At 603, the method 600 may include determining the emergency data from the live video data using a three dimensional (3D) convolution neural network (CNN) model 205. The 3D-CNN model 205 comprises a plurality of convolution layers, a plurality of pooling layers, and a plurality of fully connected layers.

In an example embodiment, a system for performing the method of FIG. 6 above may comprise a processor (e.g. the processor 201) configured to perform some or each of the operations (601 and 603) described above. The processor may, for example, be configured to perform the operations (601 and 603) by performing hardware implemented logical functions, executing stored instructions, or executing algorithms for performing each of the operations. Alternatively, the system may comprise means for performing each of the operations described above. In this regard, according to an example embodiment, examples of means for performing operations 601 and 603 may comprise, for example, the processor 201 and/or a device or circuit for executing instructions or executing an algorithm for processing information as described above.

On implementing the method 600 disclosed herein, the end result generated by the system 111 is a real-time determination of emergency data falling in a region within proximity of the vehicle 101 based on analysis of live video data captured from one or more sensors or image capturing device associated with the vehicle 101 using a 3D-CNN model. The determination of the emergency data is of utmost importance to avoid mishaps. The notification about the emergency provided by the system 111 makes the navigation reliable and indicates the vehicle 101 to re-route in case of any emergency on the route to be traversed by the vehicle.

The method disclosed herein provides an improvement in computer related technology related to emergency determination as follows: The system 111 determines emergency data falling on the vicinity of the vehicle 101 based on the training video data sets and the validation video data sets. The 3D-CNN model is trained on all different terrains, streets, speeds, etc., for accurately determining the emergency data in real-time. The emergency determination using the 3D-CNN model is a cheaper solution since it does not involve any specific hardware and has ability to predict dangerous situations using the video from the mobile camera. The 3D-CNN model is compact, fast and can be executed on a user device. The 3D-CNN model is compact since it works on 3×10^5 spatio-temporal parameters whereas the existing CNN models operate on 10^9 spatio-temporal parameters. The system 111 may also store the generated emergency data in the memory and the stored emergency data may be used to re-route other vehicles as well.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for determining emergency data associated with a vehicle in a region, the system comprising:
at least one memory configured to store computer program code instructions; and
at least one processor configured to execute the computer program code instructions to:
obtain live video data associated with the vehicle, wherein the live video data comprises one or more video clips, each video clip having equal frame count;
divide the live video data associated with the vehicle into the one or more video clips comprising a plurality of image frames;
process the one or more video clips using a three dimensional convolution neural network (3D-CNN) model, wherein the processing comprises:
convoluting an input image frame using a zero-padded kernel to obtain a convoluted image that is a feature map of the input image;
introducing non-linearity into the feature map and replacing all negative pixel data by zero using an activation function to obtain a rectified feature map; and
reducing the dimensionality of the rectified feature map using spatial pooling to obtain a max pooled feature map as an output of a first convolution layer succeeded by a first pooling layer; and
determine the emergency data associated with the vehicle in the region, based on the live video data of the vehicle using the 3D-CNN model, wherein the 3D-CNN model comprises:
a first set of layers including two convolution layers of the plurality of convolution layers and two pooling layers of the plurality of pooling layers stacked in an alternating sequence;
a second set of layers connected to the first set of layers, wherein the second set of layers include a third convolution layer and a fourth convolution layer of the plurality of convolution layers connected to the first set of layers in succession, a third pooling layer connected to the fourth convolution layer, a fifth convolution layer connected to the third pooling layer, and a fourth pooling layer connected to the fifth convolution layer in a sequence; and
a fully connected layer connected to the second set of layers and a softmax layer connected to the fully connected layer.

2. The system of claim 1, wherein the at least one processor is further configured to:
generate an emergency notification based on the emergency data; and
provide the emergency notification to one or more subjects associated with the vehicle.

3. The system of claim 2, wherein the at least one processor is further configured to control an output interface of one or more user devices associated with the vehicle to render the emergency data on at least one of a map or map instructions provided to the one or more subjects via one or more user interfaces.

4. The system of claim 1, wherein to determine emergency data the at least one processor is further configured to extract spatial features of the live-video data using the plurality of convolution layers and the plurality of pooling layers of the 3D-CNN model.

5. The system of claim 1, wherein the 3D-CNN model determines the emergency data in substantially real-time.

6. The system of claim 1, wherein the 3D-CNN model determines the emergency using only video from a mobile camera.

7. The system of claim 1, wherein the 3D-CNN model is trained using real-time video, historical video data, or a combination thereof.

8. The system of claim 1, wherein the 3D-CNN model is trained using real-time video, historical video data, or a combination thereof.

9. A method for determining emergency data associated with a vehicle in a region, the method comprising:
obtaining live video data associated with the vehicle, wherein the live video data comprises one or more video clips, each video clip having equal frame count;
dividing the live video data associated with the vehicle into the one or more video clips comprising a plurality of image frames;
processing the one or more video clips using a three-dimensional convolution neural network (3D-CNN) model, wherein the processing comprises:
convoluting an input image frame using a zero-padded kernel to obtain a convoluted image that is a feature map of the input image;
introducing non-linearity into the feature map and replacing all negative pixel data by zero using an activation function to obtain a rectified feature map; and
reducing the dimensionality of the rectified feature map using spatial pooling to obtain a max pooled feature map as an output of a first convolution layer succeeded by a first pooling layer; and
determining the emergency data associated with the vehicle in the region, based on the live video data of the vehicle using the 3D-CNN model, wherein the 3D-CNN model comprises:
a first set of layers including two convolution layers of the plurality of convolution layers and two pooling layers of the plurality of pooling layers stacked in an alternating sequence;
a second set of layers connected to the first set of layers, wherein the second set of layers include a third convolution layer and a fourth convolution layer of the plurality of convolution layers connected to the first set of layers in succession, a third pooling layer connected to the fourth convolution layer, a fifth convolution layer connected to the third pooling layer, and a fourth pooling layer connected to the fifth convolution layer in a sequence; and
a fully connected layer connected to the second set of layers and a softmax layer connected to the fully connected layer.

10. The method of claim 9, further comprising:
generating an emergency notification based on the emergency data; and
providing the emergency notification to one or more subjects associated with the vehicle.

11. The method of claim 10, further comprising controlling an output interface of one or more user devices associated with the vehicle to render the emergency data on at least one of a map or map instructions provided to the one or more subjects via one or more user interfaces.

12. The method of claim 9, wherein determining the emergency data further comprising extracting spatial features of the live-video data using the plurality of convolution layers and the plurality of pooling layers of the 3D-CNN model.

13. The system of claim 9, wherein the 3D-CNN model determines the emergency data in substantially real-time.

14. The system of claim 9, wherein the 3D-CNN model determines the emergency using only video from a mobile camera.

15. A computer program product comprising at least one non-transitory computer-readable storage medium having stored thereon computer-executable program code instructions which when executed by a computer, cause the computer to carry out operations for determining emergency data associated with a vehicle in a region, the operations comprising:
obtaining live video data associated with the vehicle, wherein the live video data comprises one or more video clips, each video clip having equal frame count;
dividing the live video data into the one or more video clips comprising a plurality of image frames;
processing the one or more video clips using a three-dimensional convolution neural network (3D-CNN) model, wherein the processing comprises:
convoluting an input image frame using a zero-padded kernel to obtain a convoluted image that is a feature map of the input image;
introducing non-linearity into the feature map and replacing all negative pixel data by zero using an activation function to obtain a rectified feature map; and
reducing the dimensionality of the rectified feature map using spatial pooling to obtain a max pooled feature map as an output of a first convolution layer succeeded by a first pooling layer; and
determining the emergency data associated with the vehicle in the region, based on the live video data of the vehicle using the 3D-CNN model, wherein the 3D-CNN model comprises:
a first set of layers including two convolution layers of the plurality of convolution layers and two pooling layers of the plurality of pooling layers stacked in an alternating sequence;
a second set of layers connected to the first set of layers, wherein the second set of layers include a third convolution layer and a fourth convolution layer of the plurality of convolution layers connected to the first set of layers in succession, a third pooling layer connected to the fourth convolution layer, a fifth convolution layer connected to the third pooling layer, and a fourth pooling layer connected to the fifth convolution layer in a sequence; and
a fully connected layer connected to the second set of layers and a softmax layer connected to the fully connected layer.

16. The computer program product of claim 15, further comprising:
generating an emergency notification based on the emergency data; and
providing the emergency notification to one or more subjects associated with the vehicle.

17. The computer program product of claim 16, further comprising controlling an output interface of one or more user devices associated with the vehicle to render the emergency data on at least one of a map or map instructions provided to the one or more subjects via one or more user interfaces.

18. The system of claim 15, wherein to determine emergency data the at least one processor is further configured to extract spatial features of the live-video data using the plurality of convolution layers and the plurality of pooling layers of the 3D-CNN model.

19. The system of claim 15, wherein the 3D-CNN model determines the emergency data in substantially real-time.

20. The system of claim 15, wherein the 3D-CNN model determines the emergency using only video from a mobile camera.

* * * * *